(12) United States Patent
Jazra et al.

(10) Patent No.: US 8,009,519 B2
(45) Date of Patent: Aug. 30, 2011

(54) APPARATUS AND METHODS FOR MAINTAINING A RELIABLE TIME CLOCK ON A MOBILE COMPUTING DEVICE SUPPORTING SATELLITE BASED POSITION DETERMINATION CAPABILITY

(75) Inventors: Cherif Jazra, Sunnyvale, CA (US); Jianxiong Shi, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 337 days.

(21) Appl. No.: 12/039,325

(22) Filed: Feb. 28, 2008

(65) Prior Publication Data
US 2009/0219205 A1    Sep. 3, 2009

(51) Int. Cl.
*G04C 11/02* (2006.01)
(52) U.S. Cl. ............................................ 368/47; 368/46
(58) Field of Classification Search .................. 368/47, 368/46; 342/357.22
See application file for complete search history.

(56) References Cited

U.S. PATENT DOCUMENTS

| | | | | |
|---|---|---|---|---|
| 5,510,797 A * | 4/1996 | Abraham et al. | ............. | 342/352 |
| 5,724,316 A * | 3/1998 | Brunts | ............................ | 368/10 |
| 6,282,431 B1 * | 8/2001 | Konno | .......................... | 455/425 |
| 6,427,120 B1 * | 7/2002 | Garin et al. | ................... | 701/213 |
| 6,584,316 B1 * | 6/2003 | Akhteruzzaman et al. | ... | 455/445 |
| 7,019,691 B1 * | 3/2006 | Soltanian et al. | ............. | 342/368 |
| 7,190,946 B2 * | 3/2007 | Mazzara et al. | ........... | 455/404.1 |
| 2002/0098857 A1 * | 7/2002 | Ishii | ............................. | 455/502 |
| 2005/0135194 A1 * | 6/2005 | Ishii | ................................ | 368/47 |
| 2007/0147175 A1 * | 6/2007 | Punkka | ........................... | 368/21 |

* cited by examiner

*Primary Examiner* — Sean Kayes (57) ABSTRACT

Various embodiments for maintaining a reliable time clock on a mobile computing device are described. In one embodiment, a mobile computing device may optionally enable and disable acquisition of time data from multiple sources including a mobile network and a global positioning system (GPS) satellite. The mobile computing device may comprise a time clock to display local time information derived from stored time data and may prioritize the multiple sources for writing and overwriting the stored time data to converge to the most reliable time data available. Other embodiments are described and claimed.

25 Claims, 3 Drawing Sheets

APPARATUS AND METHODS FOR MAINTAINING A RELIABLE TIME CLOCK ON A MOBILE COMPUTING DEVICE SUPPORTING SATELLITE BASED POSITION DETERMINATION CAPABILITY

BACKGROUND

A mobile computing device such as a combination handheld computer and mobile telephone or smart phone generally may provide voice and data communications functionality as well as computing and processing capabilities on various networks. By default or at the option of the user, the mobile computing device may synchronize an internal clock with the time broadcast by a mobile network.

For a variety of reasons attributable to the mobile network as well as the configuration of the mobile computing device, the clock may not display accurate time information when the broadcast time is acquired. Displaying inaccurate time may cause problems for the user and may adversely impact other applications which rely on time such as calendar events.

To display more accurate time, the user typically must disable network time acquisition, reference a reliable clock, and then manually input time data into the mobile computing device. Accordingly, there exists the need for an apparatus and methods for maintaining a reliable time clock on a mobile computing device.

DETAILED DESCRIPTION

Various embodiments are directed to maintaining a reliable time clock on a mobile computing device. In one or more embodiments, a mobile computing device may optionally enable and disable acquisition of time data from multiple sources including a mobile network and a global positioning system (GPS) satellite. The mobile computing device may comprise a time clock to display local time information derived from stored time data and may prioritize the multiple sources for writing and overwriting the stored time data to converge to the most reliable time data available.

Figure 1:
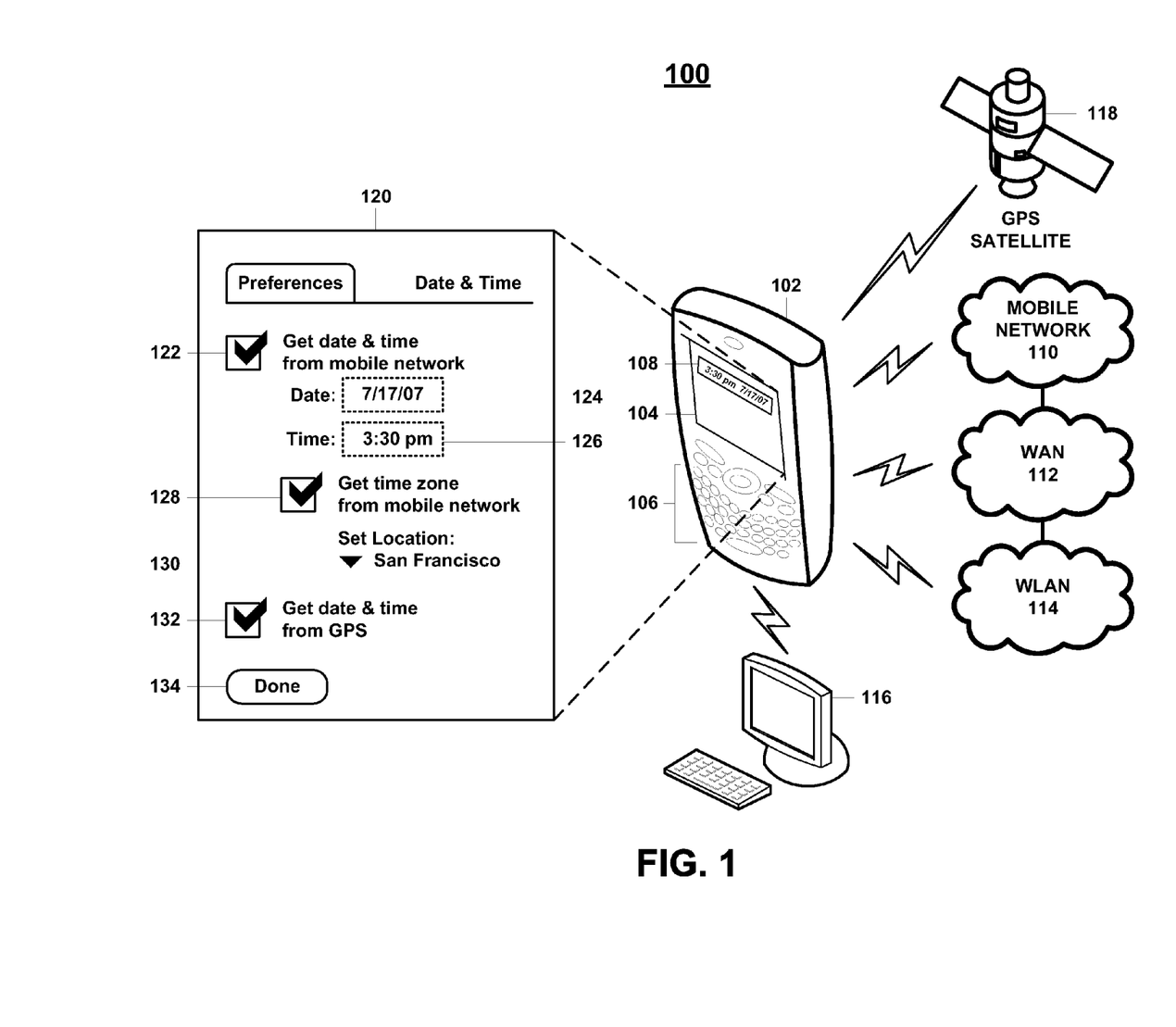
FIG. 1 illustrates one embodiment of a communications system.

FIG. 1 illustrates a communications system 100 suitable for implementing various embodiments. Elements of the communications system 100 may comprise physical or logical entities for communicating information and may be implemented as hardware, software, firmware, and/or combination thereof, as desired for a given set of design parameters or performance constraints. Although FIG. 1 depicts a limited number of elements for purposes of illustration, it can be appreciated that the communications system 100 may include more or less elements as well as other types of elements in accordance with the described embodiments.

As shown, the communications system 100 may comprise a mobile computing device 102. The mobile computing device 102 may comprise or be implemented as a combination handheld computer and mobile telephone or smart phone such as a Palm® smart phone. Although some embodiments may be described with the mobile computing device 102 implemented as a smart phone by way of example, it may be appreciated that the mobile computing device 102 may be implemented as other types of user equipment (UE) or wireless computing devices having voice and/or data communications functionality such as a handheld device, personal digital assistant (PDA), mobile telephone, combination mobile telephone/PDA, mobile unit, subscriber station, game device, messaging device, media player, pager, or any other suitable communications device in accordance with the described embodiments.

The mobile computing device 102 may comprise a housing encapsulating various internal components such as a printed circuit board (PCB), internal antennas, a removable and rechargeable battery, one or more processors (e.g., host processor, radio processor, modem processor, baseband processor), memory (e.g., volatile or non-volatile memory, removable or non-removable memory, erasable or non-erasable memory, writeable or re-writeable memory), transceivers (e.g., voice communications transceiver, data communications transceiver, GPS transceiver), and others.

The mobile computing device 102 may comprise various input/output (I/O) devices such as a display 104 and a keypad 106, for example. The display 104 may be implemented by a liquid crystal display (LCD) such as a touch-sensitive, color, thin-film transistor (TFT) LCD or other type of suitable visual interface for displaying content to a user of the mobile computing device 102. The keypad 106 may be implemented by an alphanumeric keypad 106 having a QWERTY key layout and an integrated number dial pad. The keypad 106 may comprise a physical keypad using hard buttons or a virtual keypad using soft buttons displayed on the display 104. It can be appreciated that the mobile computing device 102 may comprise various other I/O devices including keys (e.g., input keys, preset and programmable hot keys), buttons (e.g., left and right action buttons, a multidirectional navigation button, phone/send and power/end buttons, preset and programmable shortcut buttons), switches (e.g., volume rocker switch, a ringer on/off switch having a vibrate mode), a microphone, speakers, an audio headset, a camera, a stylus, and other I/O devices in accordance with the described embodiments.

The mobile computing device 102 may comprise a time clock 108 arranged to display reliable time information such as the local time and date to the user. As shown, the time clock 108 may display the local time for the mobile computing device 102 in 12-hour notation format indicating ante meridiem (am) or post meridiem (pm) along with the date in (m)m/(d)d/yy format. It can be appreciated that the time information presented to the user may include more or less information and may be displayed using various formats in accordance with the described embodiments.

The time clock 108 may comprise or be implemented by one or more hardware components, software components, firmware components, and/or combination thereof. For example, the time clock 108 may be implemented by a computer program stored on one or more types of computer-readable storage media to be executed by one or more processors of the mobile computing device 102. In some implementations, the time clock 108 may comprise a dedicated application program or system program for maintaining and/or indicating time for the mobile computing device 102. In other implementations, the time clock 108 may comprise part of an application program or system program capable of maintaining and/or indicating time in addition to performing other computing and processing operations for the mobile computing device 102.

To maintain and display accurate time information, the mobile computing device 102 and/or the time clock 108 may store and manage various types of time data such as data representing the time of day (e.g., hours, minutes, and/or seconds) in 12-hour or 24-hour notation, data representing the day of the week, data representing the date, Coordinated Universal Time (UTC) data, time zone data representing a particular time zone (e.g., EST, CST, MST, PST) and/or a positive or negative UTC offset, location data (e.g., country, city, coordinates), daylight savings time (DST) data, and/or other time data in accordance with the described embodiments. In various implementations, the local time displayed by the time clock 108 may be derived from time data representing UTC, a time zone offset to the UTC (e.g., −8 for PST), and a DST offset to the UTC (e.g., +1) when daylight savings time is in effect for the time zone.

In various embodiments, the mobile computing device 102 may receive or acquire time data from multiple sources. One source of time data may comprise input from the user of the mobile computing device 102. For example, the user may manually input time data (e.g., time, date, location, etc.) to the time clock 108 using the keypad 106 of the mobile computing device 102. In some cases, the user may manually input initial time data to the time clock 108. In other cases, the user may manually input new time data in order to overwrite existing time data so that more accurate time information is displayed by the clock 108. It can be appreciated that when relying on time data that is manually input by the user, the reliability of the time information to be displayed by the mobile computing device 102 will depend on the accuracy of the source of time data referenced by the user as well as the precision of the manual input.

Another source of time data may comprise a mobile network 110. In various embodiments, the mobile computing device 102 may be arranged to provide voice and data communications functionality by communicating with the mobile network 110 over a wireless link such as an air interface. The mobile network 110 may be implemented as a cellular radio telephone network such as a Code Division Multiple Access (CDMA) network, Global System for Mobile Communications (GSM) network, North American Digital Cellular (NADC) network, Time Division Multiple Access (TDMA) network, Extended-TDMA (E-TDMA) network, Narrowband Advanced Mobile Phone Service (NAMPS) network, third generation (3G) network such as a Wide-band CDMA (WCDMA) network, CDMA-2000 network, Universal Mobile Telephone System (UMTS) network, and others. The mobile network 110 may comprise various network elements such as a base transceiver station (BTS) or other suitable transmission element or system for broadcasting data within a particular cell or coverage area.

In various implementations, the mobile network 110 may broadcast time data, and the mobile computing device 102 may be arranged to attach to the mobile network 110 and acquire the time data broadcast by the mobile network 110. The time data broadcast by the mobile network 110 may comprise time-of-day (TOD) data and date data. For example, the mobile network 110 may broadcast UTC data representing the time of day, the day of the week, and the date. The time data broadcast by the mobile network 110 also may comprise time zone data and/or DST data.

The time data broadcast by the mobile network 110 may be used by the clock 108 to display time information. It can be appreciated that when relying on time data that is broadcast by the mobile network 110, the reliability of the time information to be displayed by the mobile computing device 102 will depend on the accuracy of the time data provided by the mobile network 110 as well as the accuracy of the time data maintained by the mobile computing device 102.

Another source of time data may comprise a Wide Area Network (WAN) 112 such as the Internet. In various embodiments, the mobile network 110 may support voice communications services as well as wireless wide area network (WWAN) data communications services including Internet access. Examples of WWAN data communications services supported by the mobile network 110 may include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. As such, the mobile computing device 102 may connect to and receive time data from a server on or via the WAN 112 such as Simple Network Time Protocol (SNTP) server.

The mobile computing device 102 also may provide data communications functionality by communicating with a wireless local area network (WLAN) 114. In various embodiments, the mobile computing device 102 may support WLAN data communications services in accordance with the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and others.

In some implementations, the mobile computing device 102 may be arranged to receive time data from a time source via the WLAN 114. For example, the mobile computing device 102 may access a time server (e.g., SNTP server) on the WAN 112 via the WLAN 114. In other implementations, the WLAN 114 may comprise a source of time data. For example, the mobile computing device 102 may access a local time sever on the WLAN 114 such as an Ethernet Network Time Protocol (NTP) server.

In some cases, a time server on the WAN 112 or WLAN 114 may provide the mobile computing device 102 with time data comprising UTC data. The time data provided by the time server on the WAN 112 or WLAN 114 may be used by the clock 108 to display time information. It can be appreciated that when relying on time data that is supplied by a time server, the reliability of the time information to be displayed by the mobile computing device 102 will depend on the accuracy of the time data maintained by the time server as well as any network delay encountered during communication of the time data. It is also noted that the time server typically will not provide time zone data or DST data, thus requiring the mobile computing device 102 to account for time zone offsets, DST policies, regional differences, and so forth.

Another source of time data may comprise a local device such as a PC 116 or other suitable communications device, computing device, and/or media device in accordance with the described embodiments. In some implementations, the mobile computing device 102 may comprise a multi-connector (e.g., power, audio, data interface) to allow a wired connection such as a Universal Serial Bus (USB) connection to the PC 116. As such, the mobile computing device 102 may be arranged to receive time data via a local wired connection to the PC 116.

The mobile computing device 102 also may be arranged to perform data communications functionality in accordance with various types of shorter range wireless networks, such as a wireless personal area network (PAN) offering Bluetooth® data communications services in accordance with the Bluetooth® Special Interest Group (SIG) series of protocols, specifications, profiles, and so forth. Other examples of shorter range wireless networks may employ infrared (IR)

techniques or near-field communication techniques and protocols, such as electromagnetic induction (EMI) techniques including passive or active radio-frequency identification (RFID) protocols and devices. As such, the mobile computing device 102 may be arranged to receive time data via a short range wireless connection (e.g., Bluetooth®, IR) to the PC 116.

The PC 116 may provide the mobile computing device 102 with time data in various formats. The time data provided by the PC 116 may be used by the clock 108 to display time information. It can be appreciated that when relying on the time data from the PC 116, the reliability of the time information to be displayed by the mobile computing device 102 will depend on the accuracy of the time data maintained by the PC 116 as well as the accuracy of the source of time data for the PC 116.

Another source of time data may comprise a GPS satellite 118. In various embodiments, the mobile computing device 102 may communicate with the GPS satellite 118 to support position determination capability in addition to and/or in conjunction with voice and data communications functionality. Examples of position determination capability may include one or more satellite based position determination techniques such as Global Positioning System (GPS) techniques, Assisted GPS (AGPS) techniques, hybrid techniques involving GPS or AGPS in conjunction with Cell Global Identity (CGI), Enhanced Forward Link Trilateration (EFLT), Advanced Forward Link Trilateration (AFTL), Time Difference of Arrival (TDOA), Angle of Arrival (AOA), Enhanced Observed Time Difference (EOTD), or Observed Time Difference of Arrival (OTDOA), and/or any other position determination techniques in accordance with the described embodiments.

The GPS satellite 118 may comprise an atomic clock and may continuously broadcast a satellite signal. In various embodiments, the mobile computing device 102 may be arranged to acquire and/or decode the satellite signal broadcast by the GPS satellite 118. The signal broadcast by the GPS satellite 118 may comprise, for example, an encoded message frame comprising time data representing the current GPS date and time at the start of the message, pseudorandom code data representing an identifier for the GPS satellite 118, ephemeris data representing orbital information for the GPS satellite 118 and for every other satellite in the GPS to calculate the location of the GPS satellite 118, and almanac data representing coarse orbit and status information (healthy or unhealthy) for each satellite in the GPS, ionospheric information, and GPS-UTC correction information to relate GPS time to UTC.

In various embodiments, the mobile computing device 102 may be arranged to acquire time data by decoding the signal broadcast by the GPS satellite 118. The time data may comprise, for example, the current GPS date and time at the start of the message transmission and GPS-UTC correction information. UTC has uniform seconds defined by International Atomic Time (TAI) with leap seconds announced at irregular intervals to compensate for the rotation of the Earth and other discrepancies. Because leap seconds are not included directly in GPS time, there is an offset between GPS time and UTC. The GPS-UTC correction information indicates the offset so that the GPS time can be converted to UTC.

The time data broadcast by the GPS satellite 118 may be converted to UTC and used by the clock 108 to display time information. It can be appreciated that using the precise time data that is broadcast by the GPS satellite 118 may improve the reliability of the time information to be displayed by the mobile computing device 102. It is noted, however, that the GPS satellite 118 typically will not provide time zone data or DST data, thus requiring the mobile computing device 102 to account for time zone offsets, DST policies, regional differences, and so forth.

In various implementations, the mobile computing device 102 may acquire the time data broadcast by the GPS satellite 118 when a position fix is invoked to determine the current location of the mobile computing device 102. To obtain a position fix comprising the coordinates for its location, the mobile computing device 102 may determine the distance to a plurality of satellites including GPS satellite 118, for example. By locating at least four satellites within view, the mobile computing device 102 can determine the distance to each of the satellites based on the signal transmission time, the signal reception time, and the speed of each satellite signal. When the distance to at least four satellites is known, the mobile computing device 102 can calculate a three-dimensional position fix including latitude, longitude, and altitude using triangulation.

The mobile computing device 102 may operate in one or more modes such as in a standalone mode or in a mobile station based (MS-based) mode to obtain a position fix. In a standalone mode (e.g., standalone GPS mode), the mobile computing device 102 may be arranged to autonomously determine its position without network interaction or support.

In an MS-based mode (e.g., MS-based AGPS mode), however, the mobile computing device 102 may determine its position with periodic assistance from a position determination entity (PDE) such as a location proxy server (LPS) and/or a mobile positioning center (MPC). When operating in an MS-based mode, the mobile computing device 102 may communicate with the PDE over a radio access network (RAN) such as a UMTS Terrestrial RAN (UTRAN) according a suitable MS-based session protocol (e.g., IS-801 protocol). The PDE may provide information to aid position determination such as satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, and so forth. The information may assist the mobile computing device 102 by improving the speed of satellite acquisition and the probability of a position fix by concentrating the search for a satellite signal. In some cases, data calls may be made and assisting information may be sent to the mobile computing device 102 from the PDE for every position fix. In other cases, data calls may be made and assistance information may be sent periodically and/or as needed.

A position fix may be invoked by the mobile computing device 102 in various ways. For example, the mobile computing device 102 may be arranged to automatically, periodically, and/or autonomously invoke a position fix. In some cases, the mobile computing device 102 may invoke a position fix in response to a command input by the user. In other cases, a position fix may be invoked in response to input received from a source external to the mobile computing device 102 such as an external network element or computing device that is attempting to locate the user of the mobile computing device 102.

A position fix may be invoked by an application on the mobile computing device 102. In some cases, the clock 108 may invoke a position fix in order to acquire time data from the GPS satellite 118. In other cases, a position fix may be invoked by application that provides one or more location based services (LBS) such as GPS services, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of services dependent upon the position of the mobile computing device 102. It can be appreciated that the embodiments are not limited in this regard and that a position fix may be invoked in other ways in accordance with the described embodiments.

In various implementations, the mobile computing device 102 and/or the clock 108 may be arranged or configured to prioritize multiple sources of time data and/or the time data acquired from multiple sources. The sources of time data may be prioritized by the mobile computing device 102 and/or the clock 108 in accordance with one or more algorithms or programming logic for converging to the most reliable time data and for displaying the most accurate time.

In general, time sources such as the mobile network 110, the user, and the GPS satellite 118 may be given different priorities so that the most accurate or reliable time data is available to the mobile computing device 102 and/or the clock 108 for displaying time information. For example, the GPS satellite 118 may be considered to provide more reliable time data compared to other sources such as the mobile network 110 and/or the user. Accordingly, time data acquired from the mobile network 110 and/or the user may be overwritten when time data from the GPS satellite 118 is available. By writing and overwriting time data based on acquisition priorities, the stored time data converges to the best time data available.

In some cases, the sources of time data for the mobile computing device 102 may be prioritized based on preferences set by the user. As shown in FIG. 1, for example, the mobile computing device 102 may present a date and time user interface (UI) 120 to the user for setting preferences for the clock 108 including options for enabling and disabling acquisition of time data from multiple sources.

The UI 120 may comprise a check box 122 to provide the user of the mobile computing device 102 with an option to enable or disable acquisition of date and time from the mobile network 110. In some implementations, acquiring date and time from the mobile network 110 may be enabled by default and/or may occur automatically. When acquisition of date and time from the mobile network 110 is enabled, the mobile computing device 102 may acquire and store time data such as UTC data representing the time of day, the day of the week, and the date. The stored time data (e.g., UTC data) may be used by the clock 108 to display local time information to the user.

In various embodiments, while acquisition of date and time from the mobile network 110 is enabled, time-of-day (TOD) data and date data acquired from the mobile network 110 may be prioritized higher than TOD data and date data from certain other sources. For example, when the check box 122 is checked, TOD data and date data acquired from the mobile network 110 may overwrite TOD data and date data provided by the user of the mobile computing device 102, a time server on the WAN 112 or WLAN 114, and/or a local device such as a PC 116.

At the option of the user, such as when time information is being displayed inaccurately, the check box 122 may be unchecked to disable the acquisition of date and time from the mobile network 110. When the acquisition of date and time from the mobile network 110 is disabled, the mobile computing device 102 no longer acquires UTC data from the mobile network 110 and may receive input from various other sources of time data. As shown in FIG. 1, for instance, the UI 120 includes a date field 124 and a time field 126 for allowing the user to manually input more accurate TOD data and date data into the clock 108. Other sources of TOD data and date data may include, for example, a time server on the WAN 112 or WLAN 114, a local device such as a PC 116, a GPS satellite 118, and so forth.

In various embodiments, when acquisition of date and time from the mobile network 110 is disabled, any TOD data and date data previously acquired from the mobile network 110 may be prioritized lower than newly acquired TOD data and date data from other sources. For example, when the check box 122 is unchecked, UTC data acquired from the mobile network 110 may be overwritten by TOD data and date data input by the user of the mobile computing device 102 or received from another sources of TOD data and date data.

The UI 120 may comprise a check box 128 to provide the user of the mobile computing device 102 with an option to enable or disable acquisition of time zone from the mobile network 110. In some implementations, acquiring the time zone from the mobile network 110 may be enabled by default and/or may occur automatically.

When acquisition of time zone from the mobile network 110 is enabled, the mobile computing device 102 may acquire and store time zone data and DST data from the mobile network 110. The mobile computing device 102 may store the acquired time zone data and DST data which can be used by the clock 108 to display local time information to the user. It can be appreciated that time zone data and DST data provided by the mobile network 110 may be more accurate than that provided by the user of the mobile computing device 102. Accordingly, acquisition of time zone from the mobile network 110 may be enabled regardless of whether acquisition of date and time from the mobile network 110 is enabled or disabled.

In various embodiments, while acquisition of time zone from the mobile network 110 is enabled, the time zone data acquired from the mobile network 110 may be prioritized higher than time zone data from certain other sources. For example, when the check box 128 is checked, time zone data acquired from the mobile network 110 may overwrite time zone data provided by the user of the mobile computing device 102 or other source of time zone data.

At the option of the user, the check box 128 may be unchecked to disable the acquisition of time zone from the mobile network 110. When the acquisition of time zone from the mobile network 110 is disabled, the mobile computing device 102 no longer acquires time zone data and/or DST data from the mobile network 110 and may receive input from other sources of time zone data. As shown in FIG. 1, for example, the UI 120 includes a pull down list 130 for allowing the user to manually select a location and/or to input a location if not included in the pull down list 130.

In various embodiments, when acquisition of time zone from the mobile network 110 is disabled, any time zone data or DST data that was previously acquired from the mobile network 110 may be prioritized lower than newly acquired time zone data from other sources. For example, when the check box 128 is unchecked, time zone data and DST data acquired from the mobile network 110 may be overwritten by time zone data and DST data provided by the user.

The UI 120 may comprise a check box 132 to provide the user of the mobile computing device 102 with an option to enable or disable acquisition of date and time from the GPS satellite 118. When acquisition of date and time from the GPS satellite 118 is enabled, the mobile computing device 102 may detect and decode a broadcast satellite signal, acquire GPS time and GPS-UTC correction information, and store converted GPS time as UTC data representing the time of day, the day of the week, and the date. The stored UTC data may be used by the clock 108 to display local time information to the user of the mobile computing device 102.

The UI 120 may comprise a done button 134 to configure the clock 108 according to the preferences of the user. In general, acquisition of time and date from the GPS satellite 118 may be enabled regardless of whether acquisition of date and time from the mobile network 110 is enabled or disabled. For example, acquisition of date and time from the GPS satellite 118 may be enabled along with acquisition of date and time and time zone from the mobile network 110. It can be appreciated that the GPS satellite 118 may provide the most reliable TOD data and date data while the mobile network 110 may provide the most reliable time zone data and DST data.

When supporting satellite based position determination, the mobile computing device 102 may acquire time data from the GPS satellite 118 when a position fix is obtained. In various embodiments, the time data stored by the clock 108 may be refreshed each time the mobile computing device 102 obtains a position fix. Position fixes may be automatically, periodically, and/or autonomously invoked by the mobile computing device 102. In general, a position fix may be invoked by the user, a processor (e.g., host, radio), and/or an application (e.g., clock 108, LBS) of the mobile computing device 102. In most cases, a position fix will be invoked in order to determine the location of the mobile computing device 102, and the time data maintained by the clock 108 may be refreshed in conjunction with performing operations to obtain the position fix. It can be appreciated, however, that a position fix may invoked specifically to acquire time data from the GPS satellite 118 in some cases.

In various embodiments, while acquisition of date and time from the GPS satellite 118 is enabled, the TOD data and date data derived from the signal broadcast from the GPS satellite 118 may be prioritized higher than TOD data and date data from all other sources. For example, when the check box 132 is checked, TOD data and date data derived from the signal broadcast from the GPS satellite 118 may overwrite TOD data and date data provided by the mobile network 110, the user of the mobile computing device 102, a time server on the WAN 112 or WLAN 114, a local device such as a PC 116, or any other source of time data.

Additionally, in some implementations, while acquisition of date and time from the GPS satellite 118 is enabled, the TOD and date data derived from a GPS signal may be locked such that it cannot be overwritten by TOD data and date data acquired from a source other than the GPS satellite 118 (or another GPS satellite in view) such as the mobile network 110, the user, a time server on the WAN 112 or WLAN 114, a local device, and so forth. For example, when the check box 132 is checked, the clock 108 may receive TOD data and date data derived from GPS satellite 118 and prevent the user and the mobile network 110 from changing the date and the time.

At the option of the user, the check box 132 may be unchecked to disable the acquisition of date and time from the GPS satellite 118. When the acquisition of date and time zone from the GPS satellite 118 is disabled, the mobile computing device 102 no longer acquires time data for the clock 108 from the GPS satellite 118 and may receive input from various other sources of time data. Other sources of time data may include the mobile network 110, the user, a time server on the WAN 112 or WLAN 114, a local device such as a PC 116, and so forth. It is noted that when the check box 132 is unchecked, time data associated with the GPS satellite 118 will not be provided to the clock 108 even if available after a position fix is obtained to determine the location of the mobile computing device 102.

In various embodiments, when acquisition of date and time from the GPS satellite 118 is disabled, any TOD data and date data previously acquired from the GPS satellite 118 may be prioritized lower than newly acquired TOD data and date data from other sources. For example, when the check box 132 is unchecked, TOD data and date data acquired from the GPS satellite 118 may be overwritten by TOD data and date data provided by the mobile network 110, the user of the mobile computing device 102, a time server on the WAN 112 or WLAN 114, and/or a local device such as a PC 116.

While deriving TOD data and date data from a signal broadcast by the GPS satellite 118 may improve the reliability of the time and date information to be displayed by the mobile computing device 102, it is noted that the GPS satellite 118 typically will not provide time zone data or DST data. Accordingly, the mobile computing device 102 may be configured to acquire time zone data and DST data from another source such as the mobile network 110 or the user of the mobile computing device 102. It can be appreciated that time zone data and DST data provided by the mobile network 110 may be more accurate than provided by the user.

As shown in FIG. 1, check box 128 and check box 132 both may be checked so that acquisition of time zone from the mobile network 110 is enabled while acquisition of date and time from the GPS satellite 118 is enabled. Check box 122 also is checked to enable acquisition of date and time from the mobile network 110. In this case, the mobile computing device 102 may acquire initial TOD data, date data, time zone data, and DST data from the mobile network 110. When a position fix is invoked, the mobile computing device 102 may acquire a signal broadcast from the GPS satellite 118 and derive current or updated TOD and date data.

The GPS satellite 118 may be prioritized higher than all other sources of TOD data and date data. Accordingly, the TOD data and date data previously acquired by the mobile network 110 may be overwritten with current or updated TOD data and date data derived from the signal broadcast by the GPS satellite 118. The time zone data and the DST data previously acquired by the mobile network 110 may be maintained. In addition, while acquisition of date and time from the GPS satellite 118 is enabled, the clock 108 may receive further updated TOD data and date data while preventing the user or the mobile network 110 from changing the date and the time.

Figure 2:
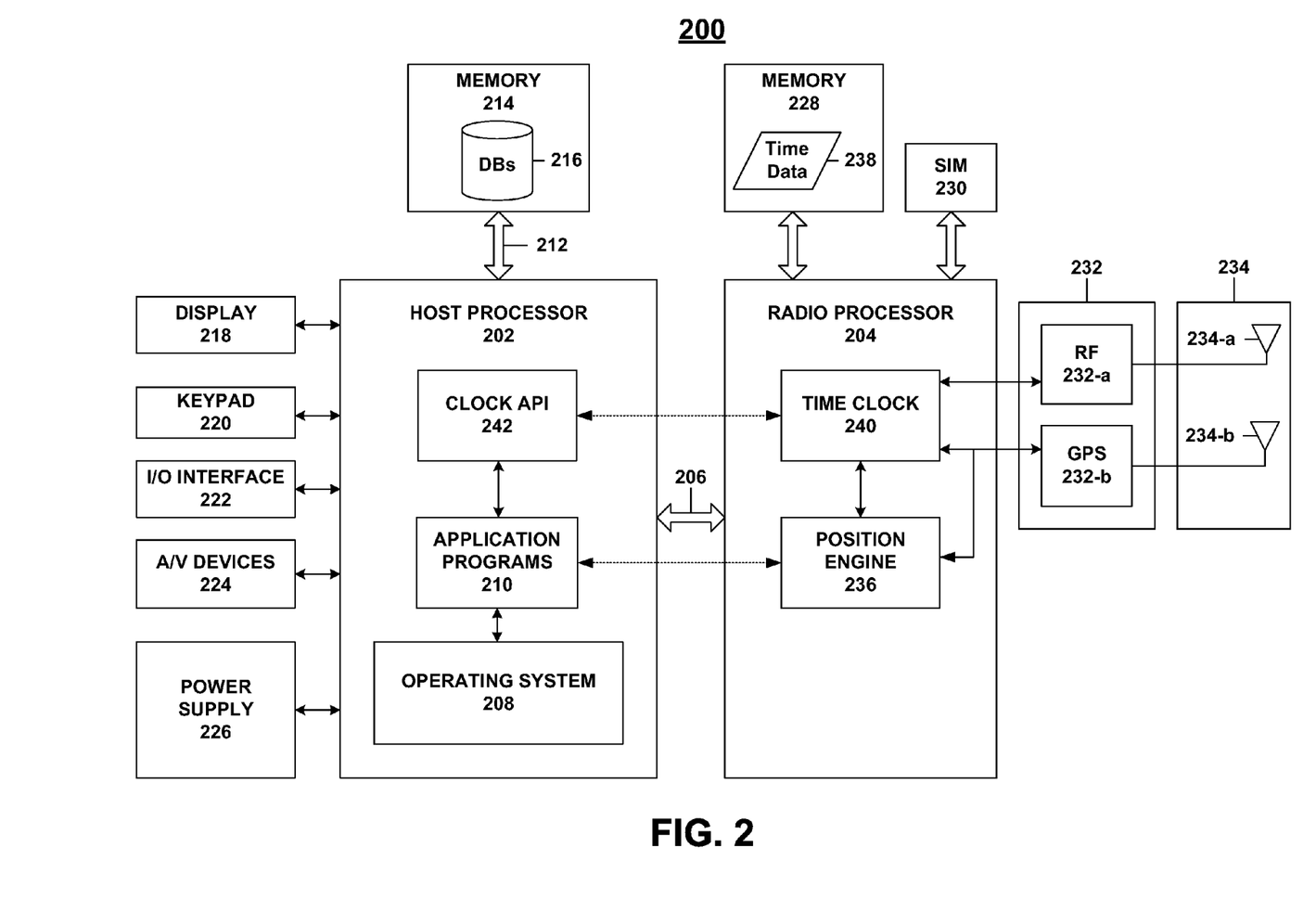
FIG. 2 illustrates one embodiment of a mobile computing device.

FIG. 2 illustrates a block diagram of a mobile computing device 200 suitable for implementing various embodiments, including the mobile computing device 102. It may be appreciated that the mobile computing device 200 is only one example of a suitable mobile computing environment and is not intended to suggest any limitation as to the scope of use or functionality of the embodiments.

As shown in the embodiment of FIG. 2, the mobile computing device 200 may comprise a dual processor architecture including a host processor 202 and a radio processor 204. In various implementations, the host processor 202 and the radio processor 204 may be arranged to communicate with each other using interfaces 206 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth. Although the mobile computing device 200 is shown with a dual-processor architecture, it may be appreciated that the mobile computing device 200 may use any suitable processor architecture and/or any suitable number of processors in accordance with the described embodiments. In one embodiment, for example, the processors 202, 204 may be implemented using a single integrated processor.

The host processor 202 may be implemented as a host central processing unit (CPU) using any suitable processor or logic device, such as a as a general purpose processor. The host processor 202 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

The host processor 202 may be responsible for executing various software programs such as system programs and applications programs to provide computing and processing operations for the mobile computing device 200. For example, the host processor 202 may be responsible for executing various software programs including system programs such as operating system (OS) 208 and application programs 210.

System programs generally may assist in the running of the mobile computing device 200 and may be directly responsible for controlling, integrating, and managing the individual hardware components of the computer system. The OS 208 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Runtime Environment for Wireless (BREW) OS, JavaOS, a Wireless Application Protocol (WAP) OS, or other suitable OS in accordance with the described embodiments. The mobile computing device 200 may comprise other system programs such as device drivers, programming tools, utility programs, software libraries, application programming interfaces (APIs), and so forth.

Application programs 210 generally may allow a user to accomplish one or more specific tasks. In various implementations, the application programs 210 may provide one or more graphical user interfaces (GUIs) to communicate information between the mobile computing device 200 and a user. In some embodiments, application programs 210 may comprise upper layer programs running on top of the OS 208 of the host processor 202 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 210 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), LBS applications, gaming applications, and so forth. Messaging applications may be arranged to communicate various types of messages in a variety of formats. Examples of messaging applications may include without limitation a cellular telephone application, a voicemail application, a Voice-over-Internet Protocol (VoIP) application, a facsimile application, an e-mail application, a short message service (SMS) application, a multimedia message service (MMS) application, a video teleconferencing application, a push-to-talk (PTT) application, a push-to-video application, Text-to-Speech (TTS) application, an instant messaging (IM) application, and so forth. It is to be appreciated that the mobile computing device 200 may implement other types of applications in accordance with the described embodiments.

While some application programs 210 generally may operate without regard to the location of the mobile computing device 200, in some embodiments, an LBS application may request and receive position information to enhance the functionality of another application program. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

As shown, the host processor 202 may be coupled through a memory bus 212 to a memory 214. The memory bus 212 may comprise any suitable interface and/or bus architecture for allowing the host processor 202 to access the memory 214. The memory 214 may be implemented using any computer-readable media capable of storing data such as volatile or non-volatile memory, removable or non-removable memory, erasable or non-erasable memory, writeable or re-writeable memory, and so forth.

Although the memory 214 may be shown as being separate from the host processor 202 for purposes of illustration, it is worthy to note that in various embodiments some portion or the entire memory 214 may be included on the same integrated circuit as the host processor 202. Alternatively, some portion or the entire memory 214 may be disposed on an integrated circuit or other medium (e.g., hard disk drive) external to the integrated circuit of the host processor 202. In various embodiments, the mobile computing device 200 may comprise an expansion slot to support a multimedia and/or memory card.

The mobile computing device 200 may include various databases 216 implemented in the memory 214. For example, the mobile computing device 200 may include a message content database, a message log database, a contacts database, a media database, a preferences database, and so forth. The message content database may be arranged to store content and attachments (e.g., media objects) for various types of messages sent and received by one or more messaging applications. The message log may be arranged to track various types of messages which are sent and received by one or more messaging applications. The contacts database may be arranged to store contact records for individuals or entities specified by the user of the mobile computing device 200. The media database may be arranged to store various types of media content such as image information, audio information, video information, and/or other data. The preferences database may be arranged to store various settings such as rules and parameters for controlling the operation of the mobile computing device 200.

The mobile computing device 200 may comprise a display 218 coupled to the host processor 202. The display 218 may comprise any suitable visual interface for displaying content to a user of the mobile computing device 200. In one embodiment, for example, the display 218 may be implemented by a liquid crystal display (LCD) such as a touch-sensitive, color, thin-film transistor (TFT) LCD screen which may be used with a stylus and/or a handwriting recognizer program.

The mobile computing device 200 may comprise an alphanumeric keypad 220 coupled to the host processor 202. The keypad 220 may comprise, for example, a QWERTY key layout and an integrated number dial pad. The keypad 220 may comprise a physical keypad using hard buttons, or a virtual keypad using soft buttons displayed on the display 218. The mobile computing device 200 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and others.

The mobile computing device 200 may comprise an input/output (I/O) interface 222 coupled to the host processor 202. The I/O interface 222 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local PC or media device. In various implementations, mobile computing device 200 may be arranged to synchronize information with the local computer system.

The host processor 202 may be coupled to various audio/video (A/V) devices 224 that support A/V capability of the mobile computing device 200. Examples of A/V devices 224 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 202 may be coupled to a power supply 226 arranged to supply and manage power to the elements of the mobile computing device 200. In various embodiments, the power supply 226 may be implemented by a rechargeable battery, such as a removable and rechargeable lithium ion battery to provide direct current (DC) power, and/or an alternating current (AC) adapter to draw power from a standard AC main power supply.

The radio processor 204 may be responsible for performing various voice and data communications operations for the mobile computing device 200 such as transmitting and receiving voice and data information over one or more wireless communications channels. The radio processor 204 may be arranged to communicate voice information and/or data information over one or more assigned frequency bands of a wireless communication channel. The radio processor 204 may be implemented as a communications processor using any suitable processor or logic device, such as a modem processor or baseband processor. The radio processor 204 may also be implemented as a digital signal processor (DSP), media access control (MAC) processor, or any other type of communications processor in accordance with the described embodiments. The radio processor 204 may perform analog and/or digital baseband operations for the mobile computing device 200. For example, the radio processor 204 may perform digital-to-analog conversion (DAC), analog-to-digital conversion (ADC), modulation, demodulation, encoding, decoding, encryption, decryption, and so forth.

The mobile computing device 200 may comprise a memory 228 coupled to the radio processor 204. The memory 228 may be implemented using any of the computer-readable media described with reference to the memory 214. Although the memory 228 may be shown as being separate from the radio processor 204, some or all of the memory 228 may be included on the same IC as the radio processor 204.

The mobile computing device 200 may comprise a subscriber identity module (SIM) 230 coupled to the radio processor 204. The SIM 230 may comprise, for example, a removable or non-removable smart card arranged to encrypt voice and data transmissions and to store user-specific data for allowing a voice or data communications network to identify and authenticate the user. The SIM 230 may store a unique user identity for a mobile subscriber such as an International Mobile Subscriber Identity (IMSI). The SIM 230 also may store data such as personal settings specific to the user. In some embodiments, the SIM 230 may be implemented as an UMTS universal SIM (USIM) card, a CDMA removable user identity module (RUIM) card, or a Universal Integrated Circuit Card (UICC). The SIM 230 also may comprise a SIM application toolkit (STK) comprising programmed commands for enabling the SIM 230 to perform various functions such as security measures. In some cases, the STK may enable the SIM 230 to independently control various aspects of the mobile computing device 200.

In some cases, the mobile computing device 102 may be implemented as a multi-band wireless device supporting operation in multiple frequency bands. For example, the mobile computing device 102 may be arranged to operate in various frequency bands or sub-bands such as the 2.4 GHz range of the ISM frequency band for WiFi and Bluetooth® communications, one or more of the 850 MHz, 900 MHZ, 1800 MHz, and 1900 MHz frequency bands for GSM, CDMA, TDMA, NAMPS, cellular, and/or PCS communications, the 2100 MHz frequency band for CDMA2000/EV-DO and/or WCDMA/JMTS communications, the 1575 MHz frequency band for Global Positioning System (GPS) operations, and other frequency bands.

The mobile computing device 200 may comprise a transceiver module 232 coupled to the radio processor 204. The transceiver module 232 may comprise one or more transceivers arranged to communicate using different types of protocols, communication ranges, operating power requirements, RF sub-bands, information types (e.g., voice or data), use scenarios, applications, and so forth. The transceiver module 232 generally may be implemented using one or more chips as desired for a given implementation. Although the transceiver module 232 may be shown as being separate from and external to the radio processor 204 for purposes of illustration, it is worthy to note that in various embodiments some portion or the entire transceiver module 232 may be included on the same integrated circuit as the radio processor 204.

In various embodiments, the transceiver module 232 may comprise one or more transceivers or components arranged to support voice and/or data communications for the wireless network systems or protocols as previously described. For example, the mobile computing device 102 may comprise one or more radio frequency (RF) transceivers 232-a supporting voice communication (e.g., CDMA, GSM, UMTS), WWAN data communication (e.g., EVDO, EVDV, CDMA/1xRTT, GSM/GPRS, EDGE, HSDPA), WLAN data communication (e.g., WiFi, WiMAX), and/or WPAN data communication (e.g., Infrared protocols, Bluetooth®, IR, EMI) in accordance with the described embodiments. The transceiver module 232 may further comprise a GPS transceiver 232-b supporting position determination and/or LBS in accordance with the described embodiments.

The mobile computing device 200 may comprise an antenna system 234 coupled to the radio processor 204 through the transceiver module 232. The antenna system 234 may transmit and/or receive electrical signals and may comprise or be implemented as one or more internal antennas and/or external antennas tuned for operating at one or more frequency bands. As shown, the antenna system 234 may comprise one or more antennas 234-a connected to one or more RF transceivers 232-a supporting voice and/or data communications in accordance with the described embodiments. The antenna system 234 may further comprise a GPS antenna 234-b connected to the GPS transceiver 232-b supporting position determination and/or LBS in accordance with the described embodiments.

The radio processor 204 may comprise or implement a position engine 236 such as GPS engine supporting satellite based position determination capabilities for the mobile computing device 200. In some embodiments, the position engine 236 may be implemented as software operating in conjunction with the GPS transceiver 232-b for allowing the mobile computing device 200 to receive and process GPS satellites signals and determine a position fix. The information generated and/or obtained by the position engine 236 generally may comprise any type of information associated with the location of the mobile computing device 200 such as latitude, longitude, altitude, heading information, vector information including horizontal and vertical velocity, sector-based position location, position uncertainty, device orientation, and so forth.

In various embodiments, the mobile computing device 200 may be arranged to derive and display local time information from time data 238 which may be stored in memory 228 or other storage media in accordance with the described embodiments. The stored time data 238 may include, for example, UTC data, time zone data, DST data, and/or other types of data used to derive the local time. The stored time data 238 may be received form multiple sources and may be written and overwritten to converge to the most reliable time data available.

The mobile computing device 200 may comprise a time clock 240 arranged to display reliable local time information to the user by accessing the stored time data 238. In this embodiment, the time clock 240 may comprise an application or computer program to be executed by the radio processor 204 including executable programming logic for prioritizing multiple sources of time data and for converging to the most reliable time data available.

The mobile computing device 200 may optionally enable and disable acquisition of time data from multiple sources including a mobile network, the user, a time server, and a GPS satellite. For instance, acquisition of date and time from the mobile network may be enabled by default or at the option of the user. When acquisition of date and time from the mobile network is enabled, the mobile computing device 200 may automatically acquire and store time data such as UTC data, time zone data, and DST data.

In general, while acquisition of date and time from the mobile network is enabled, TOD data and date data acquired from the mobile network may be prioritized higher than TOD data and date data acquired from all other sources except for the GPS satellite. And, since the GPS satellite typically does not provide time zone data and DST data, the mobile network may be prioritized higher than all other sources of time zone data and DST data.

At the option of the user, the acquisition of date and time from the mobile network may be disabled. When the acquisition of date and time from the mobile network is disabled, the mobile computing device 200 will no longer acquire UTC data from the mobile network and may receive input from various other sources of time data. For example, the mobile computing device 200 may comprise a clock application programming interface (API) 242 on the host processor 202 for receiving and communicating time data input by the user to the clock 240 via keypad 220. Time data also may be received from a time server via a WAN or a WLAN. In some cases, when acquisition of date and time from the mobile network is disabled, UTC data acquired from the mobile network may be overwritten by TOD data and date data from the user or other source.

Acquisition of time and date from a GPS satellite may be enabled by default or at the option of the user. Since the GPS satellite may be considered to be the most reliable source of time data, acquisition of time and date from the GPS satellite may be enabled regardless of whether acquisition of date and time from a mobile network is enabled or disabled. In general, when acquisition of date and time from a GPS satellite is enabled, TOD data and date data acquired from a mobile network and/or the user may be overwritten. By writing and overwriting the stored time data 238 based on acquisition priorities, the stored time data 238 converges to the best time data available.

The mobile computing device 200 may detect and decode a signal broadcast by a GPS satellite, acquire GPS time and GPS-UTC correction information, and store converted GPS time as UTC data representing the time of day, the day of the week, and the date. The mobile computing device 200 may receive time data from the GPS satellite via the GPS transceiver 232-b and/or the position engine 236 and may provide the clock 240 with UTC data whenever a position fix is obtained. In various embodiments, the position engine 236 may obtain a position fix and may refresh the clock 240 with current or updated time data.

It can be appreciated that position fixes may be automatically, periodically, and/or autonomously invoked by the mobile computing device 200. For instance, the position fix may be invoked by the user of the mobile computing device 200, an application program 210 (e.g., LBS application) on the host processor 202, the clock 240 on the radio processor 204, or in any other way in accordance with the described embodiments.

While acquisition of date and time from the GPS satellite is enabled, the TOD data and date data derived from the signal broadcast from the GPS satellite may be prioritized higher than TOD data and date data from all other sources. For example, TOD data and date data derived from the signal broadcast from the GPS satellite may overwrite TOD data and date data provided by the mobile network, the user of the mobile computing device 200, or other source of time data. Additionally, the TOD and date data derived from a GPS signal may be locked such that it cannot be overwritten by TOD data and date data acquired from a source other than a GPS satellite.

Figure 3:
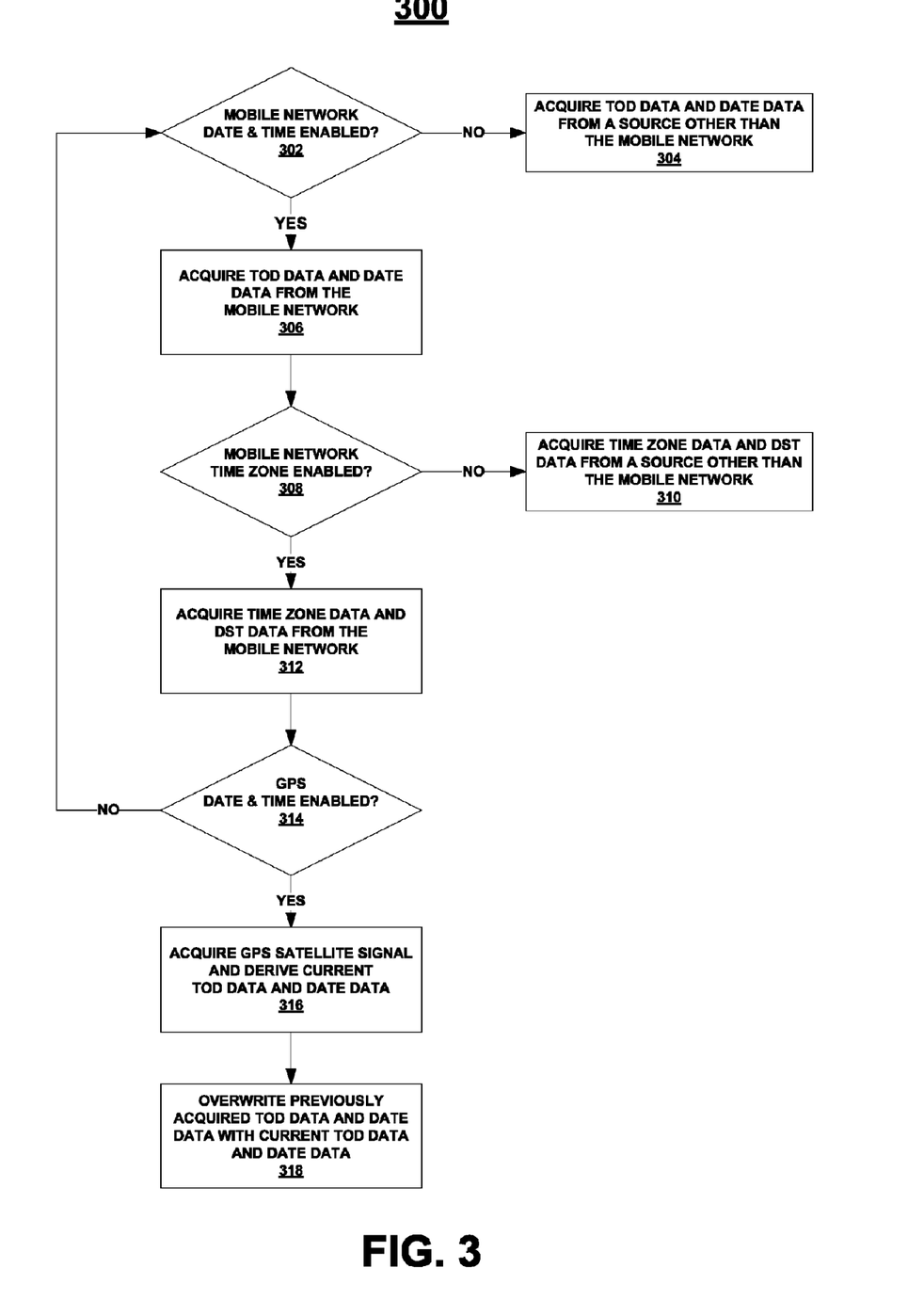
FIG. 3 illustrates one embodiment of a logic flow.

FIG. 3 illustrates a logic flow 300 in accordance with one or more embodiments. The logic flow 300 may be performed by various systems and/or devices and may be implemented as hardware, software, firmware, and/or any combination thereof, as desired for a given set of design parameters or performance constraints. For example, the logic flow 300 may be implemented by executable programming instructions to be executed by a logic device (e.g., computer, processor).

The logic flow 300 may comprise determining whether acquisition of mobile network date and time is enabled (block 302). If mobile network date and time is not enabled, then TOD data and date data may be acquired from a source other than the mobile network (block 304). If mobile network date and time is enabled, TOD data and date data may be acquired from the mobile network (block 306).

The logic flow 300 may comprise determining whether acquisition of mobile network time zone is enabled (block 308). If mobile network time zone is not enabled, then time zone data and DST data may be acquired from a source other than the mobile network (e.g., user, time server, GPS satellite) (block 310). If mobile network time zone is enabled, time zone data and DST data may be acquired from the mobile network (block 312).

The logic flow 300 may comprise determining whether acquisition of GPS date and time is enabled (block 314). If GPS date and time is not enabled, then the logic flow 300 may return to block 302. If GPS date and time is enabled, a GPS satellite signal may be acquired and current TOD data and date data may be derived by decoding the GPS satellite signal. The current TOD data and date data derived from the GPS satellite signal may be prioritized and may overwrite any previously acquired TOD data and date data (block 318).

In various embodiments, the logic flow 300 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

In various embodiments, the logic flow 300 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable storage media in accordance with the described embodiments.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, firmware components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A mobile computing device comprising:
a time clock to display local time information derived from stored time data on a display of the mobile computing device, the mobile computing device providing options for a user to enable and disable acquisition of time data from each of multiple sources, the multiple sources including a mobile network and a global positioning system (GPS) satellite, the mobile computing device to prioritize the multiple sources by overwriting stored time data from the mobile network with time data from the GPS satellite when the multiple sources are simultaneously available to the mobile computing device.

2. The mobile computing device of claim 1, wherein time data broadcast by the mobile network is acquired automatically while acquisition of time data from the mobile network is enabled.

3. The mobile computing device of claim 1, wherein time data is acquired from sources other than the mobile network while acquisition of time data from the mobile network is disabled.

4. The mobile computing device of claim 3, wherein time data is input by a user of the mobile computing device.

5. The mobile computing device of claim 3, wherein time data is retrieved from a time server.

6. The mobile computing device of claim 1, wherein time data is acquired from the GPS satellite when a position fix is invoked to determine a current location of the mobile computing device.

7. The mobile computing device of claim 1, wherein the stored time data comprises at least time-of-day (TOD) data and date data, the mobile computing device to prioritize the GPS satellite over all other sources of TOD data and date data while acquisition of date and time from the GPS satellite is enabled.

8. The mobile computing device of claim 7, wherein previously acquired TOD data and date data is overwritten with current TOD data and date data derived from a signal broadcast by the GPS satellite.

9. The mobile computing device of claim 7, wherein TOD and date data derived from a signal broadcast by the GPS satellite cannot be overwritten with new TOD and date data acquired from a source other than the GPS satellite while acquisition of date and time from the GPS satellite is enabled.

10. The mobile computing device of claim 1, the time data stored by the time clock comprising time zone data and daylight savings time (DST) data, the mobile computing device to enable acquisition of time zone from the mobile network while acquisition of date and time from the GPS satellite is enabled.

11. The mobile computing device of claim 10, the mobile network having priority over all other sources of time zone data and DST data while acquisition of time zone from the mobile network is enabled.

12. The mobile computing device of claim 11, wherein previously acquired time zone data and DST data is overwritten with current time zone data and DST data acquired from the mobile network.

13. The mobile computing device of claim 11, wherein time zone data and DST data cannot be overwritten with new time zone data and DST data acquired from a source other than the mobile network while acquisition of time zone from the mobile network is enabled.

14. The mobile computing device of claim 10, the time clock to derive the local time from stored time data comprising current Coordinated Universal Time (UTC) data, time zone data representing a time zone offset to the UTC, and DST data representing a DST offset to the UTC.

15. The mobile computing device of claim 14, wherein the current UTC data is derived from GPS time and GPS-UTC correction information decoded from a signal broadcast by the GPS satellite and overwrites UTC data previously acquired from the mobile network, and the time zone data and DST data are broadcast by the mobile network.

16. A method comprising:
acquiring time data by a mobile computing device from multiple sources including a mobile network and a global positioning system (GPS) satellite;
prioritizing the GPS satellite relative to the mobile network;
acquiring time data comprising time-of-day (TOD) data and date data broadcast by a mobile network;
storing the time data acquired from the mobile network;
deriving time data comprising current TOD and date data from a decoded signal broadcast by the GPS satellite;
overwriting the stored time data acquired from the mobile network with the time data derived from the GPS satellite when the multiple sources are simultaneously available to the mobile computing device; and
displaying local time information derived from the stored time data comprising the current TOD data and date data time.

17. The method of claim 16, further comprising acquiring time zone data from the mobile network.

18. The method of claim 16, further comprising acquiring daylight savings time (DST) data from the mobile network.

19. The method of claim 16, further comprising disabling acquisition of date and time from the mobile network.

20. The method of claim 19, further comprising acquiring TOD data and date data manually input by a user of the mobile computing device.

21. A computer-readable storage medium comprising executable computer program instructions that, when executed by a processor, enable a computing system to:
acquire time data by a mobile computing device from multiple sources including a mobile network and a global positioning system (GPS) satellite;
prioritize the GPS satellite relative to the mobile network;
acquire time data comprising time-of-day (TOD) data and date data broadcast by a mobile network;
store the time data acquired from the mobile network;
derive time data comprising current TOD and date data from a decoded signal broadcast by the GPS satellite;
overwrite the stored time data acquired from the mobile network with the time data derived from the GPS satellite when the multiple sources are simultaneously available to the mobile computing device; and display local time information derived from the stored time data comprising the current TOD data and date data time.

22. The computer-readable storage medium of claim 21, further comprising executable computer program instructions that when executed enable a computing system to acquire time zone data from the mobile network.

23. The computer-readable storage medium of claim 21, further comprising executable computer program instructions that when executed enable a computing system to acquire daylight savings time (DST) data from the mobile network.

24. The computer-readable storage medium of claim 21, further comprising executable computer program instructions that when executed enable a computing system to disable acquisition of date and time from the mobile network.

25. The computer-readable storage medium of claim 21, further comprising executable computer program instructions that when executed enable a computing system to acquire TOD data and date data manually input by a user of the mobile computing device.

* * * * *